United States Patent
Maruyama et al.

(10) Patent No.: US 7,498,589 B2
(45) Date of Patent: Mar. 3, 2009

(54) SCANNING PROBE MICROSCOPE

(75) Inventors: Shigenobu Maruyama, Oiso (JP); Mineo Nomoto, Yokohama (JP); Toru Kurenuma, Tsuchiura (JP); Yuichi Kunitomo, Tsuchiura (JP); Yukio Kembo, Tokyo (JP)

(73) Assignee: Hitachi Kenki Fine Tech Co., Ltd., Tokyo (JP)

( * ) Notice: Subject to any disclaimer, the term of this patent is extended or adjusted under 35 U.S.C. 154(b) by 284 days.

(21) Appl. No.: 11/251,795

(22) Filed: Oct. 18, 2005

(65) Prior Publication Data
US 2006/0097162 A1 May 11, 2006

(30) Foreign Application Priority Data
Oct. 19, 2004 (JP) ............... 2004-303991

(51) Int. Cl.
*G21K 7/00* (2006.01)
(52) U.S. Cl. ............... 250/442.11; 250/306; 250/309; 250/310; 250/311; 73/105
(58) Field of Classification Search ......... 250/306–311, 250/442.11; 73/105
See application file for complete search history.

(56) References Cited

U.S. PATENT DOCUMENTS

| | | | | |
|---|---|---|---|---|
| 5,286,977 A * | 2/1994 | Yokoyama et al. | ..... | 250/442.11 |
| 5,656,769 A * | 8/1997 | Nakano et al. | ..... | 73/105 |
| 5,834,643 A * | 11/1998 | Cheng | ..... | 73/105 |
| 5,945,671 A * | 8/1999 | Yasutake | ..... | 250/306 |
| 6,018,991 A * | 2/2000 | Nakano | ..... | 73/105 |
| 6,167,753 B1 * | 1/2001 | Chen et al. | ..... | 73/105 |
| 6,229,607 B1 * | 5/2001 | Shirai et al. | ..... | 356/614 |
| 6,323,483 B1 * | 11/2001 | Cleveland et al. | ..... | 250/306 |
| 6,848,320 B2 * | 2/2005 | Miyajima et al. | ..... | 73/763 |
| 6,851,301 B2 * | 2/2005 | Kim et al. | ..... | 73/105 |
| 7,168,301 B2 * | 1/2007 | Su et al. | ..... | 73/105 |
| 2001/0049959 A1 * | 12/2001 | Neukermans et al. | ..... | 73/104 |
| 2003/0233870 A1 * | 12/2003 | Mancevski | ..... | 73/105 |

FOREIGN PATENT DOCUMENTS

| | | | |
|---|---|---|---|
| JP | 11-023584 | | 1/1999 |
| JP | 2003-202284 | | 7/2003 |
| JP | 2003194693 A | * | 7/2003 |
| JP | 2004-125540 | | 4/2004 |
| JP | 2004-191277 | | 7/2004 |

* cited by examiner

*Primary Examiner*—David A. Vanore
*Assistant Examiner*—Michael J Logie
(74) *Attorney, Agent, or Firm*—Antonelli, Terry, Stout & Kraus, LLP.

(57) ABSTRACT

A scanning probe microscope for measuring a surface profile of a sample by bringing a probe into close proximity to or contact with the surface of the sample and scanning the sample surface includes: a sample stage movable in at least one axis direction; the probe which is brought into close proximity to or contact with the surface of the sample mounted on the sample stage and scans the sample surface; a probe-driving unit for moving the probe three-dimensionally; a probe deflection detector for detecting a deflection of the probe; and an observation optical system which has an objective lens and observes the probe disposed on substantially the optical axis of the objective lens, and the sample. The probe-driving unit is disposed with three sets of paired drive sources arranged essentially with symmetry with respect to the optical axis of the objective lens.

10 Claims, 9 Drawing Sheets

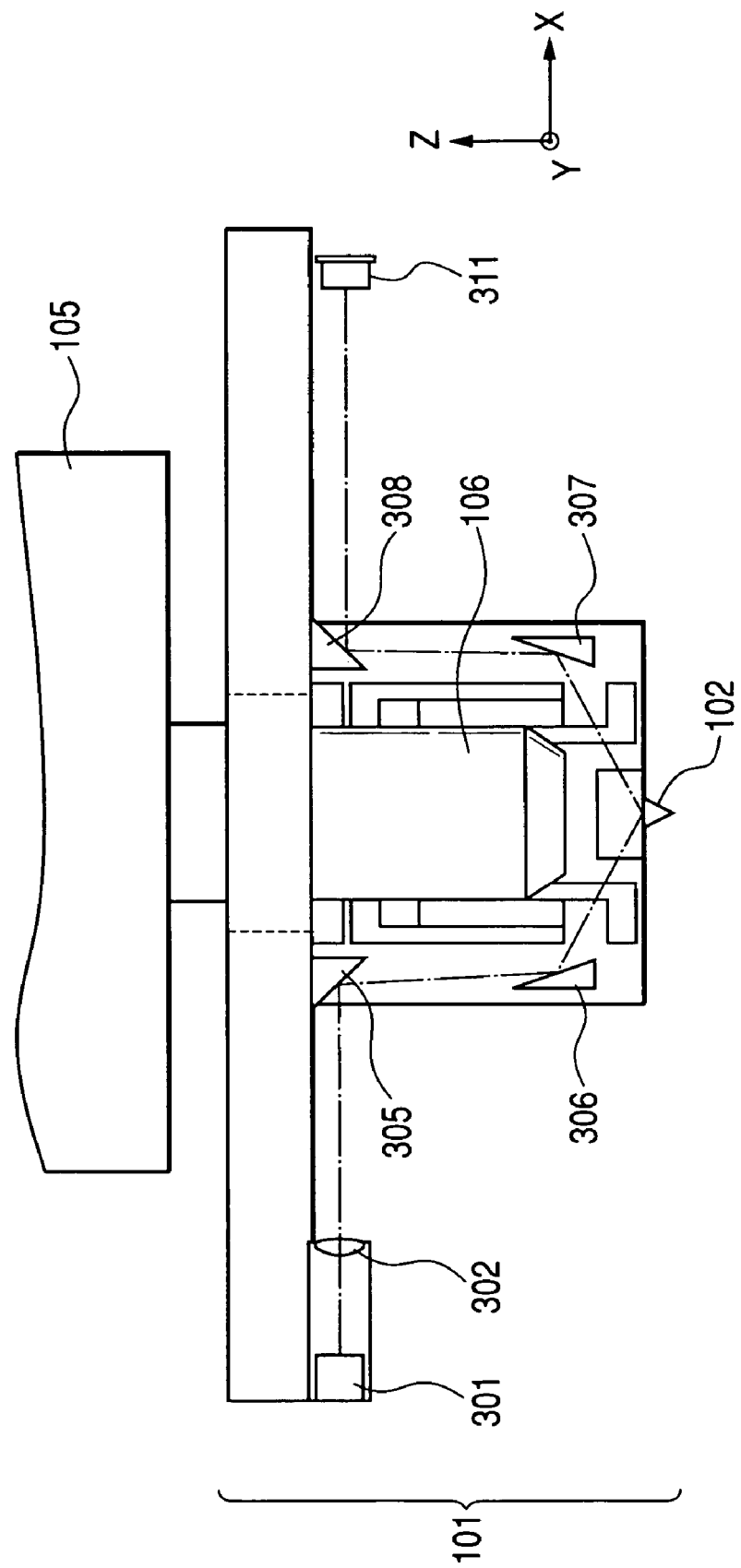

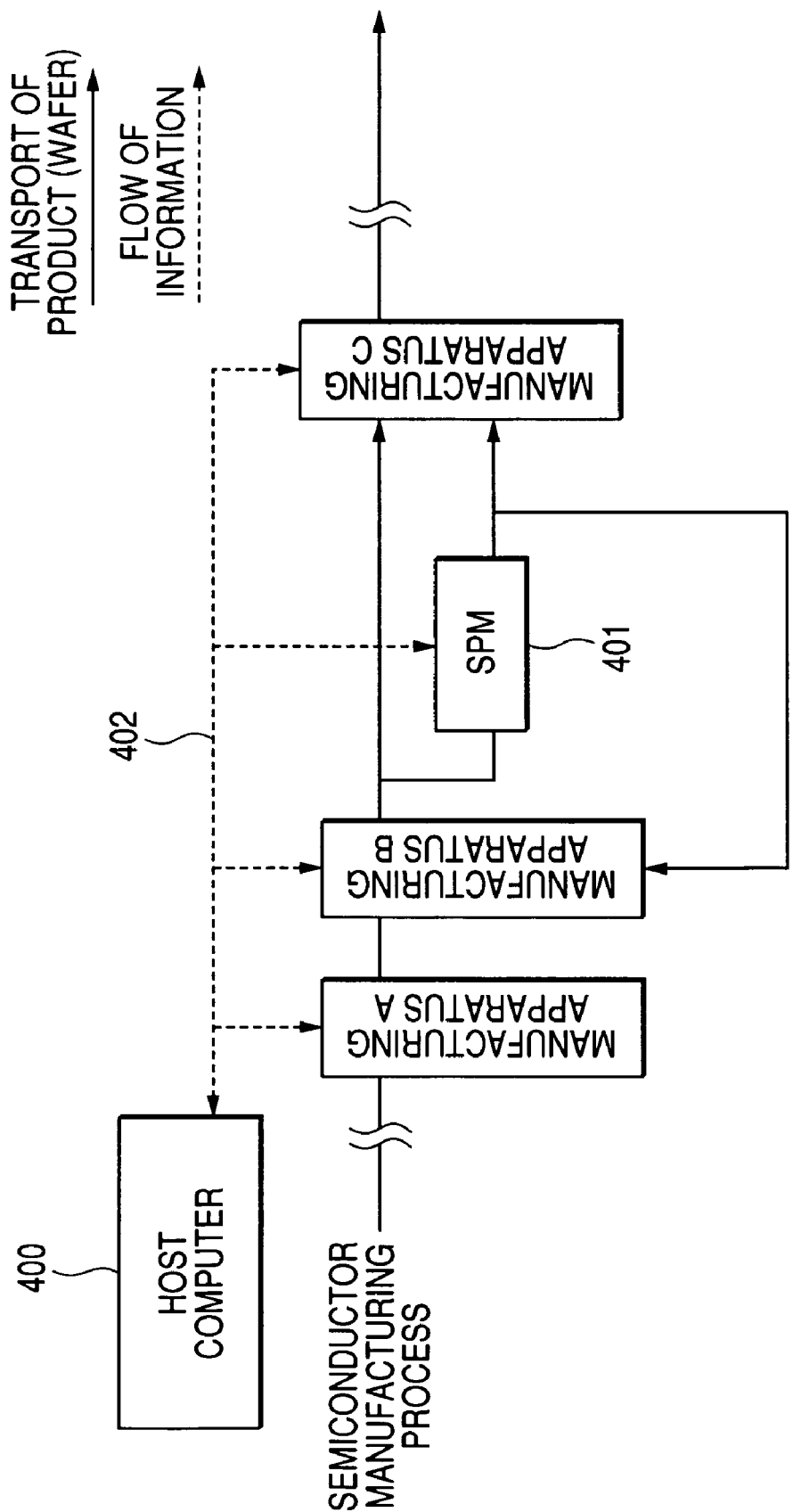

SCANNING PROBE MICROSCOPE

BACKGROUND OF THE INVENTION

The present invention relates to a scanning probe microscope used in applications such as measuring surface profile data of semiconductors, and to a method of measuring surface profile data using the scanning probe microscope.

The importance of semiconductor inspection and measurement technology and defect-analyzing technology in semiconductor-manufacturing processes is growing with the continued progress of finer circuit patterning, associated with increases in the integration densities of semiconductor circuits. Using a scanning probe microscope (SPM) in surface profile data measurement of semiconductors is widely known as a technique for measuring surface profile data of samples to an accuracy of the atomic order of magnitude by scanning the surface of each sample with the very small tip of a probe being kept in close proximity to or in intermittent contact with the surface.

During the surface profile data measurement with SPM, whereas inspection regions are limited to confined regions down to square of several-hundred micrometers, a mechanical section for scanning with the probe is required to be of high positioning accuracy. Either a tubular three-dimensional driving mechanism constructed by combining a plurality of piezoelectric elements cylindrically, or a tri-pod three-dimensional driving mechanism constructed by tri-axially combining piezoelectric rods of the stacked type has been employed as the mechanical section for positioning the probe of the scanning probe microscope very accurately on a sample.

These probe-driving mechanisms, however, have the drawback that they structurally cause circular arc errors during probing. At the same time, the straightness of probe-driving axes also deteriorates since the force needed to drive one scanning axis affects the other two axes for structural reasons. As SPM-based measuring accuracy improves, the effects upon the other two axes may appear more obviously as distortions of three-dimensional images.

In addition, although SPM has an advantage that data on the stereographic surface profiles of samples can be measured with a high resolution of about 0.1 nanometer, sufficient measuring throughput cannot be obtained since SPM requires time-consuming operations during the determination of measuring positions on the surface of the sample and/or during the measurement. In semiconductor-manufacturing lines, therefore, SPM has been mainly used to analyze defects off-line, not in-line (during manufacturing processes).

However, if it is possible to detect the abnormality of various process apparatus immediately from SPM-based measurement results and feed back detection results to the processing parameters required for the process apparatus, the manufacturing yield in the particular semiconductor-manufacturing line can be improved by minimizing the manufacture of defective products. The implementation of in-line SPM is therefore anticipated. In the realization of in-line SPM, it is an important factor how many measuring positions can be processed (measured) per unit time, and a processing time of 20 seconds or less per position is required for current semiconductor-manufacturing lines. This processing time is equivalent to 30 wafers per hour (wph) in terms of measuring throughput.

Examples of such a probe-driving mechanism for improving the positioning accuracy of a probe include the three-dimensional scanning mechanism disclosed in Patent Reference 1. This probe-driving mechanism uses three voice coil motors to drive a tri-axis stage constructed by forming, in a Y-stage connected to an outer frame via resilient members, an XZ stage (X-Z combination stage) connected to the Y-stage via resilient members.

All stages are integrally formed using the same member, and the driving force of an independent voice coil motor is transmitted to each stage via a spindle. This probe-driving mechanism is constructed so that regardless of the displacement of the associated stage, each spindle is always pressed against the stage in parallel to the operating direction thereof. For example, when only the Y-stage operates, all resilient members connecting the Y-stage to the outer frame equally undergo elastic deformation and thus prevent unnecessary force from being applied to operation axes other than the Y-axis. In this way, the probe-driving mechanism is realized that can control probe positioning independently for each of the three axes and with high accuracy.

Also, Patent Reference 2 proposes a uniaxial parallel flat-plate-type micro-moving mechanism having resilient members and piezo-driving elements in combination. This mechanism is constructed by forming a fixed section (outer frame) and a movable section (stage) into a single unit via elastic deformation sections and inserting stacked piezo-elements between the outer frame and the stage to fix the integrally formed unit. The rotational components (circular arc errors) occurring in the moving direction of the stage can be eliminated since the movement of the stage is limited to the deforming direction of the elastic deformation sections. Combining more than one uniaxial micro-moving mechanism proposed in Patent Reference 2 allows an SPM probe-driving mechanism to be constructed.

In addition, Patent Reference 3 discloses an SPM configuration for improvement of measuring throughput. This configuration improves the measuring throughput of the SPM by detecting the surface of a sample by means of an objective lens disposed directly above the probe, and an approach sensor constituted by a laser diode and a photodiode, and bringing the sample surface close to the tip of the probe at high speed to reduce the time required for the SPM to start measurements.

Patent Reference 4 also discloses specific examples of an approach sensor constructed for the same purpose as that described in Patent Reference 3. In the SPM configurations shown in Patent References 3 and 4, since an objective lens is disposed directly above the probe contact position on the sample, it is possible to start measurements without moving the sample, after the measuring positions thereon have been determined using observation optics, and hence to improve the measuring throughput of the SPM.

[Patent Reference 1]
Japanese Patent No. 3544453
[Patent Reference 2]
Japanese Patent Laid-open No. 2004-191277
[Patent Reference 3]
Japanese Patent Laid-open No. 2003-202284
[Patent Reference 4]
Japanese Patent Laid-open No. 2004-125540

SUMMARY OF THE INVENTION

In the probe-driving mechanism disclosed in Patent Reference 1, since the driving element (voice coil motor) for driving one stage is adapted to apply force to the elastic deformation sections in four places, linear movement of the stage is possible, only when the four elastic deformation sections all become equally deformed. This poses a problem in that since a voice coil motor, a spindle, and a stage are linearly arranged and since elastic deformation sections exist at both the left and right sides of the stage, if the inequality of spring force occurs between the left and right elastic deformation sections, these elastic deformation sections structurally deteriorate the straightness of the stage. This problem also applies to the uniaxial micro-moving mechanism shown in Patent Reference 2.

Additionally, in the probe-driving mechanism disclosed in Patent Reference 2, there is a problem in that since the voice coil motor for driving the XZ stage is disposed at an upper section of a probe-scanning mechanism, the probe installed at the bottom of the XZ stage cannot be observed from immediate above. This makes it necessary, during the time from completion of mounting a sample in the SPM to the start of measurements, to move the sample to the probe-scanning mechanism after detection of the measuring positions on the sample using a detector (observation optics) provided independently of the probe-scanning mechanism, and thus reduces the measuring throughput of the SPM.

For example, if the spacing between the observation optics for measurement positioning, and the probe-scanning mechanism (SPM image measuring position), is 150 millimeters, the sample stage with a wafer mounted thereon needs to be actuated with each change of the measuring position on the wafer, and a time from 2 to 3 seconds is required for each actuating operation. This time is equivalent to about 20 to 30 seconds per wafer, and the measuring throughput of the SPM correspondingly decreases.

A decrease in the measuring throughput of the SPM becomes critical when the SPM is used to immediately feed back measurement results to the various process apparatuses in a semiconductor-manufacturing line. There is a further problem in that when the actuation of the sample stage is followed by measurement positioning with the observation optics, the resulting influence on the positioning accuracy of the sample stage shifts the SPM image measuring positions and prevents SPM images from being obtained at desired measuring positions.

Furthermore, the SPM probe-driving mechanisms disclosed in Patent References 3 and 4 have a problem in that when the probe is driven three-dimensionally, sufficient positioning accuracy of the probe cannot be obtained and the three-dimensional images of the sample that have been obtained from measurements suffer distortion.

A first object of the present invention is to provide: a scanning probe microscope capable of, in a probe-driving mechanism that conducts SPM probe scanning, controlling a probe position with high accuracy by reducing errors in straightness of various driving axes; and a measuring method using the scanning probe microscope.

A second object of the present invention is to provide: a scanning probe microscope capable of, in a probe-driving mechanism that controls SPM probe scanning, controlling a probe position with high accuracy by detecting a moving displacement of a driving axis; and a measuring method using the scanning probe microscope.

A third object of the present invention is to provide: a high-throughput scanning probe microscope that can control an SPM probe position with high accuracy and be used for immediately feeding back measurement results to processing parameters of various process apparatuses in a semiconductor-manufacturing line; and a measuring method using the scanning probe microscope.

The above first object is attained by: a scanning probe microscope having a probe-driving mechanism including one set of stage-driving mechanisms constructed with each stage by pairing two stage-driving mechanisms, each of the paired stage-driving mechanisms being constituted by two elastic deformation elements arranged on an extension line of an expansion/contraction axis of a piezo-element, on either side of the stage; and a measuring method using the scanning probe microscope.

The above second object is attained by: a scanning probe microscope which, in a probe-driving mechanism including one set of stage-driving mechanisms constructed with each stage by pairing two stage-driving mechanisms, each of the paired stage-driving mechanisms being constituted by two elastic deformation elements arranged on an extension line of an expansion/contraction axis of a piezo-element, on either side of the stage, has a function that measures stage displacements with a displacement sensor and servo-controls the stage displacements; and a measuring method using the scanning probe microscope.

The above second object is likewise attained by: a scanning probe microscope which, in a probe-driving mechanism including one set of stage-driving mechanisms constructed with each stage by pairing two stage-driving mechanisms, each of the paired stage-driving mechanisms being constituted by two elastic deformation elements arranged on an extension line of an expansion/contraction axis of a piezo-element, on either side of the stage, has a function that measures stage displacements with a displacement sensor, detects stage-positioning errors, and corrects SPM images; and a measuring method using the scanning probe microscope.

The above third object is attained by: a scanning probe microscope which, in a SPM with a probe-driving mechanism including one set of stage-driving mechanisms constructed with each stage by pairing two stage-driving mechanisms, each of the paired stage-driving mechanisms being constituted by two elastic deformation sections arranged on an extension line of an expansion/contraction axis of a piezo-element, on either side of the stage, is configured so that observation optical system can be disposed directly above a probe by providing a through-hole in part of the stages constituting the probe-driving mechanism; and a measuring method using the scanning probe microscope.

The above third object is likewise attained by: a scanning probe microscope including a probe-driving mechanism for holding and positioning a probe, a probe-driving controller for controlling the probe-driving mechanism, a sample stage for holding and positioning a sample, a stage controller for controlling sample stage operation, observation optical system for observing the surface of the sample or the probe by utilizing a through-hole provided in the probe-driving mechanism, an optical image processor for processing an optical image obtained using the observation optical system, a probe deflection detector for detecting that a tip of the probe has come into contact with the sample surface, a probe scan controller for controlling the probe scans conducted for SPM image sampling, an SPM image generator, and a total controller with a function of exchanging manufacturing process information and SPM inspection results with a host computer for semiconductor-manufacturing processes; and a measuring method using the scanning probe microscope.

Alternatively, the above third object is attained by: a scanning probe microscope including a probe-driving mechanism for holding and positioning a probe, a probe-driving controller for controlling the probe-driving mechanism, a stage displacement detector for measuring stage displacements of the probe-driving mechanism and servo-controlling the stage thereof, a sample stage for holding and positioning a sample, a stage controller for controlling sample stage operation, observation optics for observing the surface of the sample or the probe by utilizing a through-hole provided in the probe-driving mechanism, an optical image processor for processing an optical image obtained using the observation optical system, a probe deflection detector for detecting that a tip of the probe has come into contact with the sample surface, a probe scan controller for controlling the probe scans conducted for SPM image sampling, an SPM image generator, and a total controller with a function of exchanging manufacturing process information and SPM inspection results with a host computer for semiconductor-manufacturing processes; and a measuring method using the scanning probe microscope.

According to the present invention, the probe of a scanning probe microscope can be positioned very accurately for improved measuring accuracy during scanning probe microscopy. In addition, since it is possible to confirm measuring positions with observation optical system and acquire SPM images, the scanning probe microscope and a measuring method using this microscope can be improved in throughput.

Furthermore, application of a scanning probe microscope and a measuring method using the same, both provided according to the present invention, allows the optimization of processing parameters on manufacturing apparatus, based on the measurement results obtained by the scanning probe microscope and by the measuring method using the same. The optimization of the processing parameters improves a semiconductor-manufacturing process yield. Moreover, improvement of the semiconductor-manufacturing process yield is effective in reducing industrial waste.

BRIEF DESCRIPTION OF THE DRAWING

These and other features, objects and advantages of the present invention will become more apparent from the following description when taken in conjunction with the accompanying drawings, wherein:

FIG. 3 is a front sectional view for explaining a probe deflection detector of the SPM according to the first embodiment;

FIGS. 7A and 7B are schematic diagrams for explaining the semiconductor-manufacturing processes that use an SPM, FIG. 7A being a block diagram showing part of the semiconductor-manufacturing processes and FIG. 7B being a flowchart for explaining a series of SPM operational sequences.

DETAILED DESCRIPTION OF PREFERRED EMBODIMENTS

Preferred embodiments for carrying out the present invention will be described below.

First Embodiment

Figure 1:
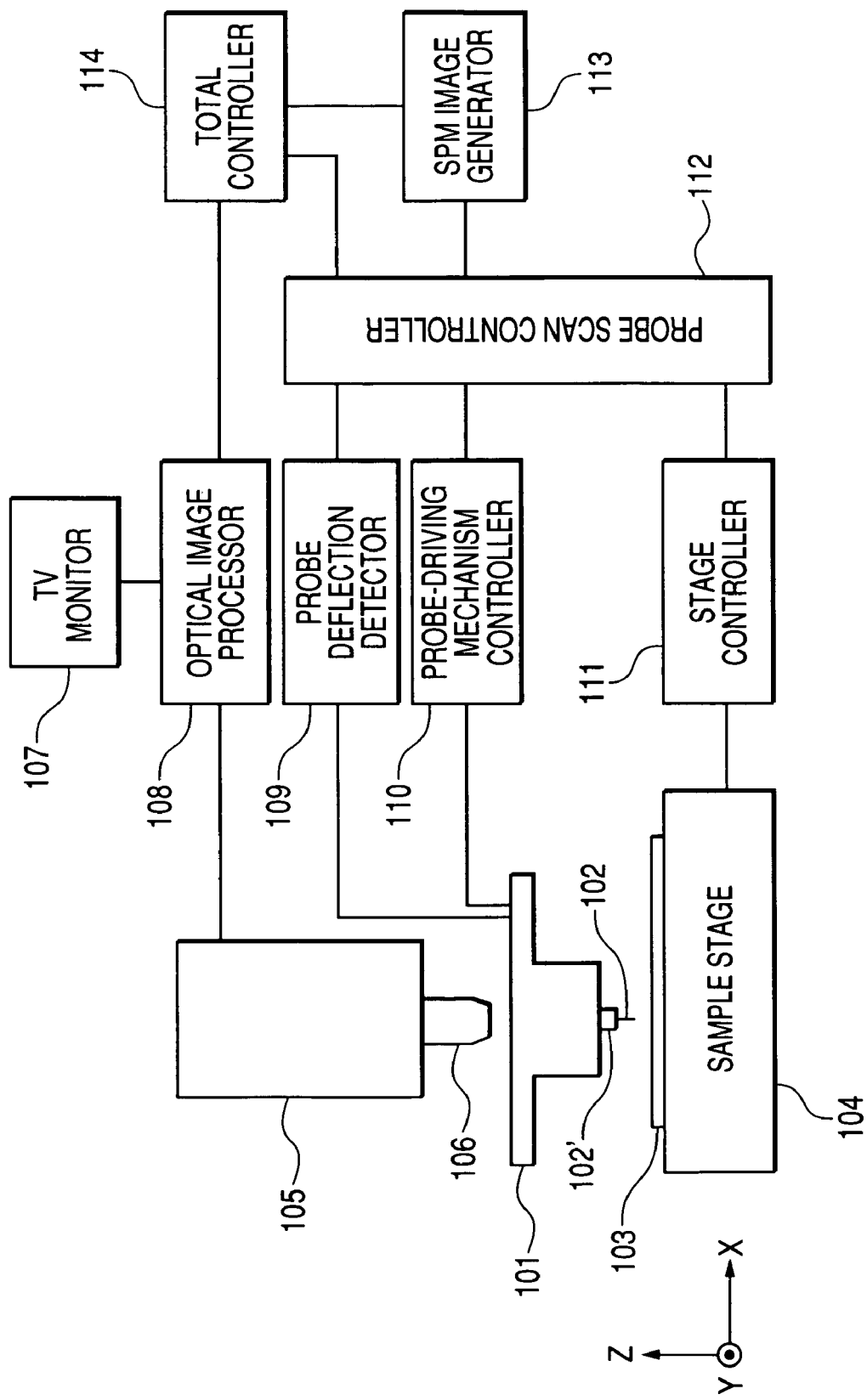
FIG. 1 is a schematic block diagram of an SPM according to a first embodiment of the present invention.

A configuration of an SPM according to the present invention, as a first embodiment thereof, is described below using FIGS. 1 to 3. In FIG. 1, reference number 103 denotes a semiconductor wafer to be measured, and 104 a sample stage for vacuum-attracting the wafer 103 and moving it in X-, Y-, and Z-directions and in a direction of rotation within an XY plane. Operation of the sample stage is controlled by a stage controller 111. A probe 102 is held by a probe-driving (probe-movement) mechanism 101 via a probe holder 102'. The probe-driving mechanism 101 positions the probe 102 precisely in the X-, Y-, and Z-directions, on and above the wafer 103. The probe 102 is formed of a silicon material, and is processed with a convergent ion beam to have a tip diameter of 10 nanometers or less. Although the probe 102 is constituted by a cantilever and a probe portion formed at a front end thereof, the cantilever and probe portion combined are referred to simply as the probe in the present specification.

An observation optical system tube 105 with an objective lens 106 is disposed above the probe-driving mechanism 101. Observation optical system 105 contains an image acquisition camera, and when an optical image of the surface of the wafer 103 is enlarged by the objective lens 106, the optical image is displayed on a TV monitor 107 via an optical image processor 108. The observation optical system 105 and the objective lens 106 have a focusing axis that moves vertically in the Z-direction by means of a moving mechanism not shown.

Figure 2A:
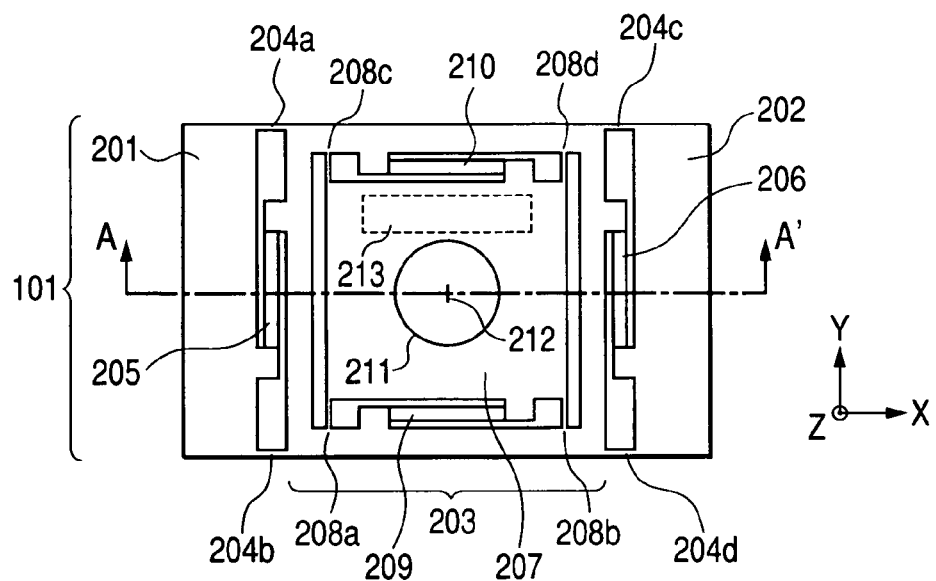
FIGS. 2A, 2B and 2C are structural views for explaining a probe-movement mechanism of the SPM that is the first embodiment, FIGS. 2A to 2C showing an XY plane view of a probe-movement mechanism 101, an A-A' sectional view thereof, and a YZ plane view thereof, respectively.
Figure 2B:
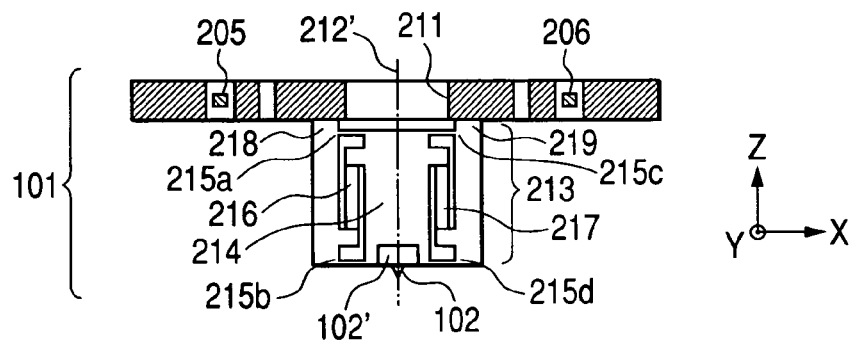
Figure 2C:
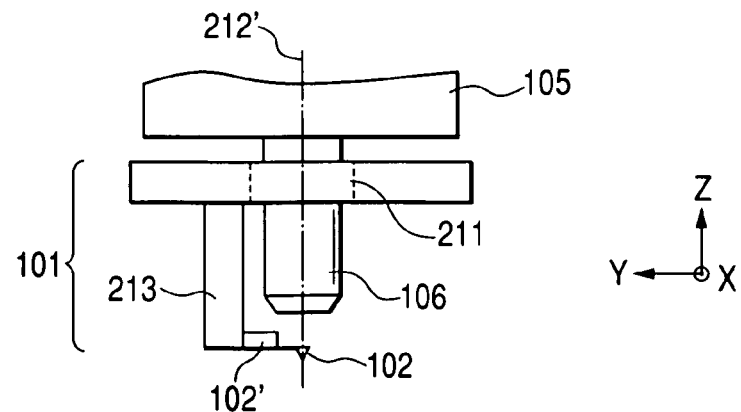

FIGS. 2A to 2C are explanatory diagrams showing a structure of the probe-driving mechanism 101 shown in FIG. 1. More specifically, FIGS. 2A to 2C are an XY plane view of the probe-driving mechanism 101, an A-A' sectional view thereof, and a YZ plane view thereof, respectively. The probe-driving mechanism 101 has a Y-stage 203 formed integrally with holders 201 and 202 in one plane via elastic deformation sections (elements) 204a, 204b, 204c, 204d, and has an X-stage 207 integrally formed in the same plane as that of the Y-stage 203, in a form orthogonal thereto, via elastic deformation sections (elements) 208a, 208b, 208c, 208d.

The X-stage 207 has a through-hole 211 for the objective lens 106 to extend therethrough. Stacked-type piezoelectric elements (hereinafter, referred to simply as piezo-elements) 205, 206 are bonded between the holders 201, 202, and the Y-stage 203, and the Y-stage 203 is driven (moved) in a direction of a Y-axis by equal simultaneous expansion/contraction of the piezo-elements 205, 206. Namely, the Y-stage 203 is moved by actuating (driving) each of the two piezo-elements 205, 206 in same direction with same displacement at same time.

One set of paired driving mechanisms (paired actuator mechanisms), one counterpart constituted by the piezo-element 205 and the elastic deformation sections 204a, 204b, and the other counterpart by the piezo-element 206 and the elastic deformation sections 204c, 204d, are arranged at symmetrical positions with respect to a central field-of-view position 212 of the objective lens (i.e., a tip position of the probe 102).

A general piezo-element (piezoelectric ceramic element) is constructed so that a displacement change of about one nanometer can be obtained by applying a direct-current voltage of one volt. A uniaxial driving element that yields a moving distance of about several tens of micrometers can be obtained by stacking a plurality of such piezo-elements on one another. The piezo-elements 205, 206 employed in the present embodiment both provide a maximum moving distance of 20 micrometers and a moving resolution of 1 nanometer.

Piezo-elements 209, 210 are bonded between the Y-stage 203 and the X-stage 207, and the X-stage 207 is driven (moved) in a direction of an X-axis by equal simultaneous expansion/contraction of the piezo-elements 209, 210. Namely, the X-stage 207 is moved by actuating (driving) each of the two piezo-elements 209, 210 in same direction with same displacement at same time.

One set of paired driving mechanisms (paired actuator mechanisms), one counterpart constituted by the piezo-element 209 and the elastic deformation sections 208a, 208b, and the other counterpart by the piezo-element 210 and the elastic deformation sections 208c, 208d, are arranged at symmetrical positions across the central field-of-view position 212 of the objective lens (i.e., the tip position of the probe 102). The piezo-elements 209, 210 also provide a maximum moving distance of 20 micrometers and a moving resolution of 1 nanometer.

At the bottom of the X-stage 207, a Z-axis mechanism 213 is installed in a form orthogonal to the plane on which the Y-stage 203 and the X-stage 207 can move. In the Z-axis mechanism 213, fixed sections 218, 219 and a Z-stage 214 are integrally formed in one plane via elastic deformation sections (elements) 215a, 215b, 215c, 215d. Piezo-elements 216, 217 are bonded between the fixed sections 218, 219 and the Z-stage 214, and the Z-stage 214 is driven in a direction of a Z-axis by equal simultaneous expansion/contraction of the piezo-elements 216, 217. Namely, the Z-stage 214 is moved by actuating (driving) each of the two piezo-elements 216, 217 in same direction with same displacement at same time.

One set of paired driving mechanisms (paired actuator mechanisms), one counterpart constituted by the piezo-element 216 and the elastic deformation sections 215a, 215b, and the other counterpart by the piezo-element 217 and the elastic deformation sections 215c, 215d, are arranged at symmetrical positions with respect to an optical axis 212' of the objective lens, on an XZ plane. The piezo-elements 216, 217 provide a maximum moving distance of 10 micrometers and a moving resolution of 1 nanometer. The probe 102 is installed at the Z-stage 214 via the probe holder 102', and the probe 102 is adapted to align its tip position with the central field-of-view position 212 of the objective lens.

As described above, in the probe-driving mechanism (the probe-movement mechanism) 101 according to the present invention, the X-stage 207, Y-stage 203, and Z-stage 214 that three-dimensionally drive (move) the probe 102 can each be operated independently without interfering with one another. Also, for example, for the Y-stage 203, two stage-driving (stage-actuator) mechanisms, one constituted by two elastic deformation sections 204a, 204b arranged on an extension line of an expansion/contraction axis of the piezo-element 205, on either side thereof, and the other by the piezo-element 206 and the elastic deformation sections 204c, 204d, are arranged as a pair across the Y-stage 203. This arrangement equally expands/contracts the piezo-elements 205, 206, thus allowing equal deformation of all elastic deformation sections 204a, 204b, 204c, 204d.

Consequently, it becomes possible to eliminate Abbe's errors of the Y-stage 203 and hence to improve straightness thereof significantly, compared with the straightness obtainable using conventional technology. It is self-evident that these principles of operation are exactly the same as for the X-stage 207 and the Z-stage 214 as well. Operation of the X-stage 207, Y-stage 203, and Z-stage 214 in the probe-driving mechanism 101 is controlled by a probe-driving mechanism controller 110.

For piezo-elements of the stacked type, the amount of expansion/contraction displacement generated when voltage is applied may vary from element to element. Even in the same piezo-element, hysteresis characteristics also exist between applied voltage and the amount of displacement. In this case, preferably, different hysteresis characteristics are analyzed for each piezo-element beforehand and then a voltage to be applied to obtain a desired amount of displacement is adjusted for each piezo-element.

Additionally, while the present embodiment has employed piezo-elements to operate the X-stage 207, Y-stage 203, and Z-stage 214 of the probe-driving mechanism 101, the kind of power source (drive source) for each stage is not limited to piezo-elements and can be any linear actuator having the accuracy/capability required for positioning the probe 102. An aluminum alloy, an iron-nickel alloy with a low thermal expansion coefficient (linear expansion coefficient), or other materials are used to constitute the probe-driving mechanism 101.

The observation optical system tube 105 and objective lens 106 arranged at upper portions of the probe-driving mechanism 101 can be moved vertically in the Z-axis direction by means of a moving mechanism not shown, and the objective lens 106 is inserted into the through-hole 211 of the X-stage 207 so as to prevent contact with the probe-driving mechanism 101. In the configuration of the probe-driving mechanism 101 according to the present invention, since a mechanism for scanning with the probe 102 is absent thereon or thereabove, the probe 102 can be directly observed using the objective lens 106, and at the same time, the surface of the wafer 103 can be observed with high resolution. For example, if the objective lens 106 has specifications of 0.3 or more, preferably, 0.4 or more, in numerical aperture and 6 millimeters in operating distance, patterns present on the wafer 103 can be clearly observed under the conditions of 1 micrometer or less in resolution.

Additionally, with the probe 102 remaining fixed in position, moving the objective lens 106 and the sample stage 104 downward through the same displacement (e.g., 1 millimeter) to such an extent that the objective lens 106 does not come into contact with the probe 102 allows the patterns on the wafer 103 directly below the probe.102 to be observed without being affected by presence of the probe 102 disposed within the field of the objective lens 106. The patterns can be observed in this fashion because the large numerical aperture of the objective lens 106 makes it possible to utilize the optical phenomenon obtained under the conditions where the probe 102 occupies only a part of the field of the objective lens 106.

FIG. 3 is an XZ plane view of the probe-driving mechanism 101, shown to explain a construction of a probe deflection detector which detects contact between the probe 102 and the surface of the wafer 103. Reference number 301 denotes a laser diode with an oscillation wavelength of 600 nanometers and an oscillation output of 0.1 milliwatt. Laser light that has been emitted from the laser diode 301 is shaped into parallel light by a collimating lens 302, then reflected in the Y-axis direction by a mirror 303 (not shown) installed in the holder 201, and after being reflected once again in the X-axis direction by a mirror 304 (not shown) installed in the Y-stage 203, being incident onto a rear face of the probe 102 via the mirrors 305, 306.

The laser light that has been reflected from the rear face of the probe 102 is further reflected by mirrors 307, 308, then after being bent in the Y-axis direction by a mirror 309 (not shown) installed in the Y-stage 203, reflected once gain in the X-axis direction by a mirror 310 (not shown) installed in the holder 202, and received by a laser light receiver 311. Irrespective of a particular position of the probe 102, the amount of deflection of the probe can be detected as a change in laser irradiation position on a laser light receiving surface of the laser light receiver 311 by fixing the laser diode 301 to the holder 201 of the probe-driving mechanism 101, the laser light receiver 311 to the holder 202, and the mirrors 305, 306, 307, 308 to the Z-stage 214 by means of a jig not shown. A position-sensitive device (PSD), an image sensor, a two-in-one photodiode, or the like can be used as the laser light receiver 311.

Consequently, when the probe 102 and the wafer 103 come into contact with each other, deflecting the probe 102, the laser irradiation position is moved in the Y-axis direction on the light-receiving surface of the laser light receiver 311. This change in the laser irradiation position is then converted into a voltage signal by the laser light receiver 311 and contact between the probe 102 and the surface of the wafer 103 is detected by a probe deflection detector 109.

The probe deflection detector 109, the probe-driving mechanism controller 110, and the stage controller 111 are connected to a probe scan controller 112, all apparatus operation is controlled by a total controller 114, and a three-dimensional image of the surface of the sample to be measured is generated in an SPM image generator.

As described above, according to the first embodiment of the present invention, in the mechanism that scans three-dimensionally with the SPM probe, one set of stage-driving mechanisms, each of the mechanisms being constituted by two elastic deformation sections (elements) arranged on an extension line of the expansion/contraction axis of a piezo-element on either side thereof, are arranged so as to form one pair of stage-driving mechanisms on either side (left or right) of each stage. Equal expansion/contraction of the two piezo-elements provided for each stage, therefore, allows equal deformation of all four deformation sections of the stage. Consequently, it becomes possible to eliminate Abbe's errors of each stage and hence to improve the straightness thereof significantly, compared with the straightness obtainable using the conventional technology.

In addition, the three axes for scanning with the probe can be moved without interfering with one another, and each driving axis can be operated independently. Furthermore, since a mechanism for scanning with the probe is absent thereon or thereabove, the probe can be directly observed using the objective lens, and at the same time, the surface of the object (sample) to be measured can be observed with high resolution. Thus, measurements can be started immediately after the measuring positions on the sample to be measured have been detected using the observation optical system. The measurements can also be conducted while the measuring positions on the sample to be measured are being detected using the observation optical system.

According to the first embodiment described above, it is possible to realize highly accurate, rapid, in-line SPM with improvements in measuring accuracy and in measuring throughput.

Second Embodiment

Figure 4:
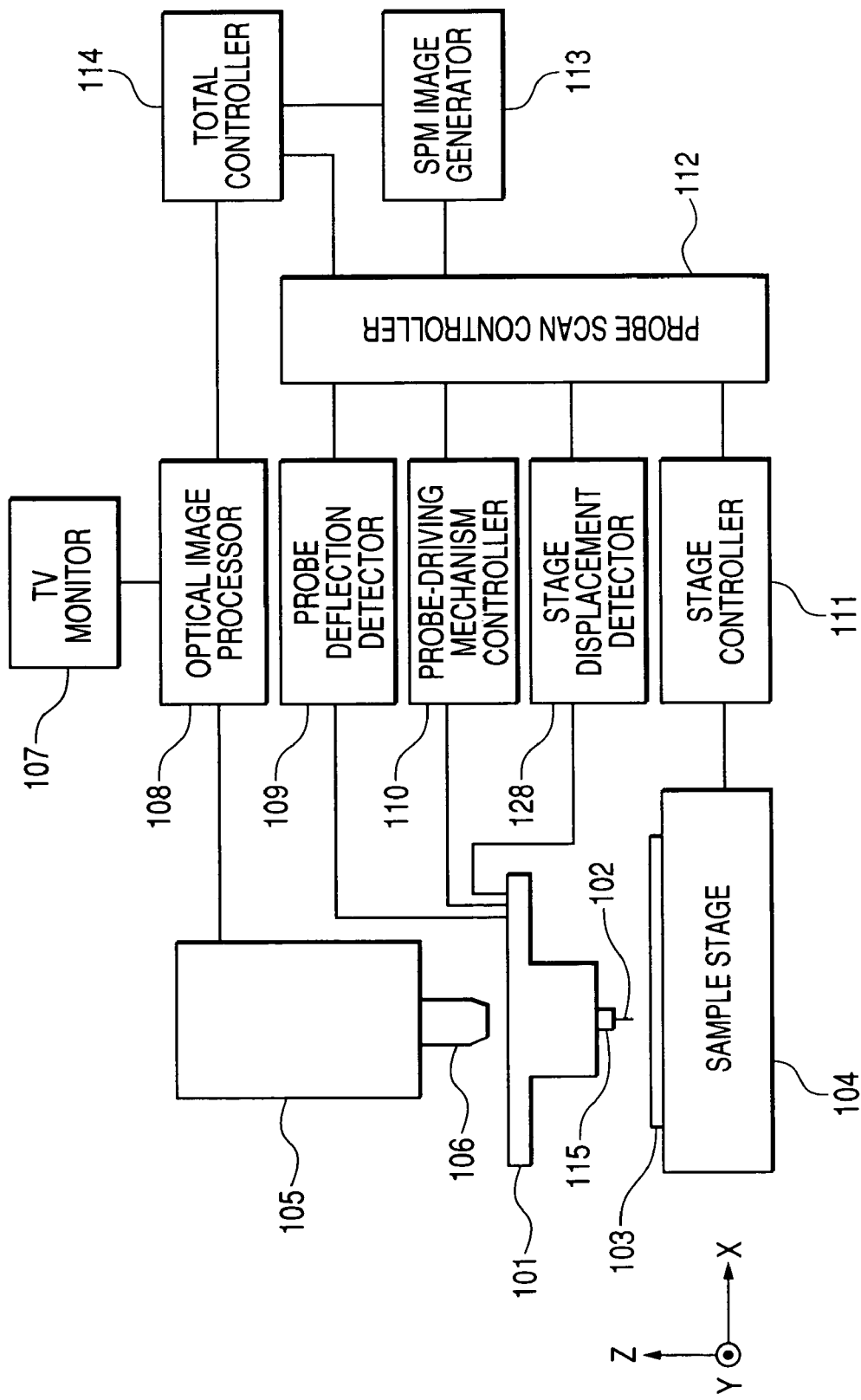
FIG. 4 is a schematic block diagram of an SPM according to a second embodiment of the present invention.

A configuration of an SPM according to a second embodiment of the present invention is described below using FIGS. 4, 5A, 5B and 5C. In FIG. 4, reference number 103 denotes a semiconductor wafer to be measured, and 104 denotes a sample stage for vacuum-attracting the wafer 103 and moving it in X-, Y-, and Z-directions and in a direction of rotation within an XY plane. Operation of the sample stage is controlled by a stage controller 111. A probe 102 is held by a probe-driving mechanism 101 via a probe holder 115.

The probe-driving mechanism 101 positions the probe 102 precisely in the X-, Y-, and Z-directions, on and above the wafer 103. The probe 102 is formed of a silicon material, and is processed with a convergent ion beam to have a tip diameter of 10 nanometers or less. Although the probe 102 is constituted by a cantilever and a probe portion formed at a front end thereof, the cantilever and probe portion combined are referred to simply as the probe in the present specification.

An observation optical system tube 105 with an objective lens 166 is disposed above the probe-driving mechanism 101. Observation optical system 105 contains an image acquisition camera, and when an optical image of the surface of the wafer 103 is enlarged by the objective lens 106, the optical image is displayed on a TV monitor 107 via an optical image processor 108. The observation optical system 105 and the objective lens 106 have a focusing axis that moves vertically in the Z-direction by means of a moving mechanism not shown.

Figure 5A:
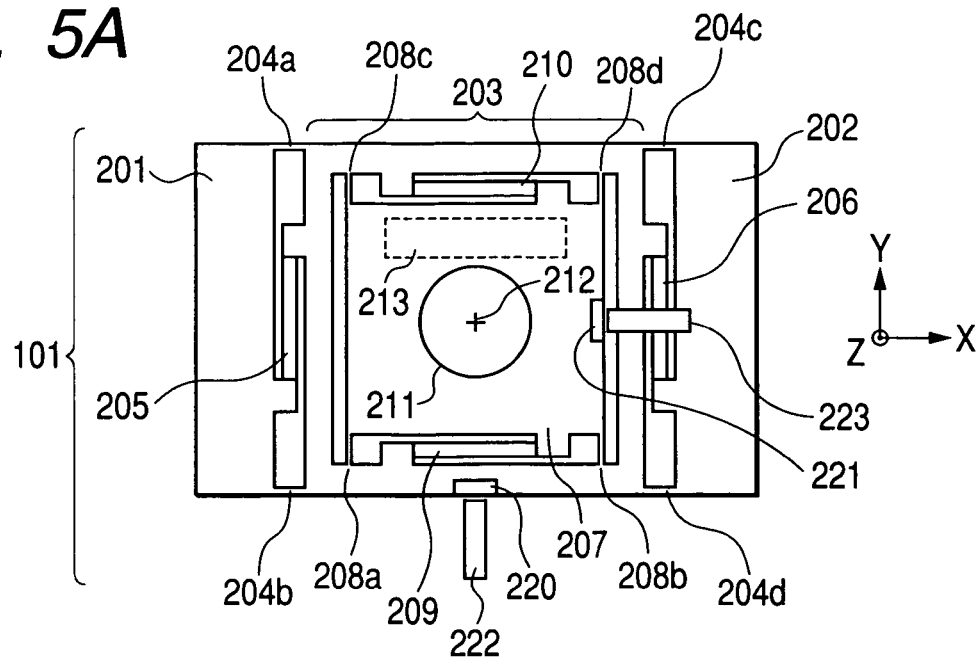
FIGS. 5A, 5B and 5C are structural views for explaining a probe-driving (probe-movement) mechanism of the SPM according to the second embodiment, FIGS. 5A to 5C showing an XY plane view of probe-driving (probe-movement) mechanism 101, an XZ plane view thereof, and a YZ plane view thereof, respectively.
Figure 5B:
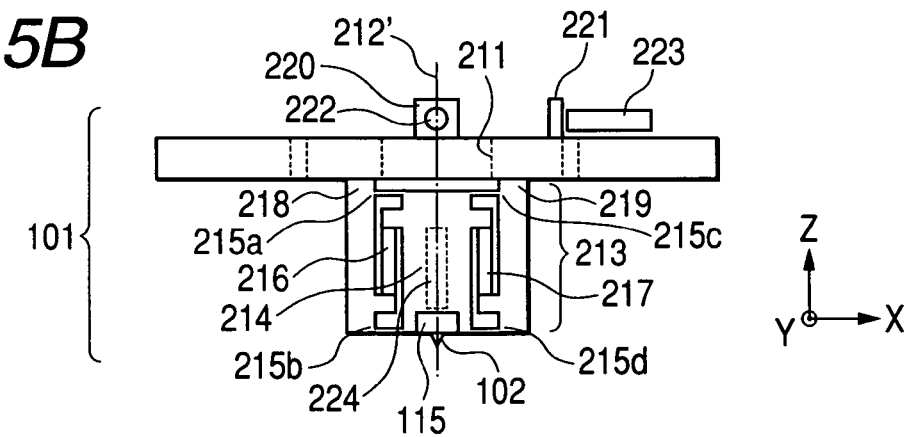
Figure 5C:
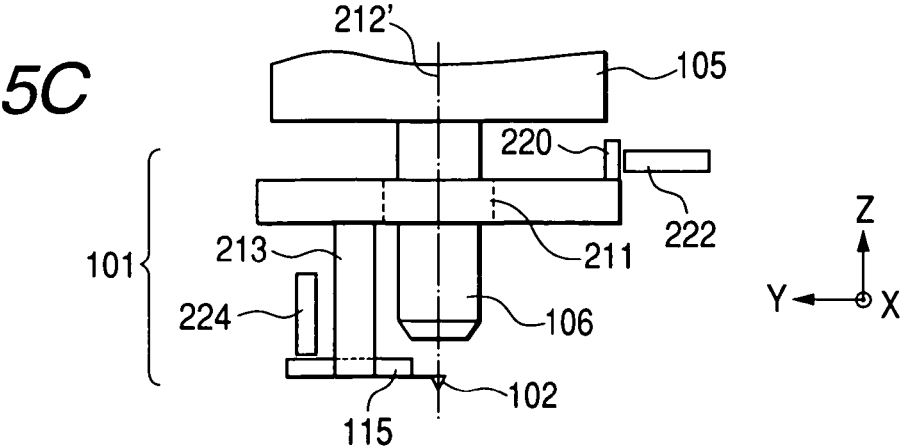

FIGS. 5A to 5C are explanatory diagrams showing a structure of the probe-driving mechanism 101 shown in FIG. 4. More specifically, FIGS. 5A to 5C show an XY plane view of the probe-driving mechanism 101, an XZ plane view thereof, and a YZ plane view thereof, respectively. The probe-driving mechanism 101 has a Y-stage 203 formed integrally with holders 201 and 202 in one plane via elastic deformation sections (elements) 204a, 204b, 204c, 204d, and has an X-stage 207 integrally formed in the same plane as that of the Y-stage 203, in a form orthogonal thereto, via elastic deformation sections (elements) 208a, 208b, 208c, 208d.

The X-stage 207 has a through-hole 211 for the objective lens 106 to extend therethrough. Stacked-type piezoelectric elements (hereinafter, referred to simply as piezo-elements) 205, 206 are bonded between the holders 201, 202, and the Y-stage 203, and the Y-stage 203 is driven in a direction of a Y-axis by equal simultaneous expansion/contraction of the piezo-elements 205, 206. One pair of driving mechanisms, one counterpart constituted by the piezo-element 205 and the elastic deformation sections 204a, 204b, and the other counterpart by the piezo-element 206 and the elastic deformation sections 204c, 204d, are arranged at symmetrical positions with respect to a central field-of-view position 212 of the objective lens (i.e., a tip position of the probe 102).

A general piezo-element (piezoelectric ceramic element) is constructed so that a displacement change of about one nanometer can be obtained by applying a direct-current voltage of one volt. A uniaxial driving element that yields a moving displacement of about several tens of micrometers can be obtained by stacking a plurality of such piezo-elements on one another. The piezo-elements 205, 206 employed in the present embodiment both provide a maximum moving distance of 20 micrometers and a moving resolution of 1 nanometer.

The Y-stage 203 is provided with a Y-axis capacitive sensor 222 fixed to at least either one of two holders 201 and 202 by a mechanism not shown, and with a target 220 opposed to the Y-axis capacitive sensor 222. A spacing between the target 220 and the Y-axis capacitive sensor 222 whose surface is opposed to the target 220 is 200 nanometers. The Y-axis capacitive sensor 222 used in this configuration can detect the spacing between the target 220 and the surface of the sensor 222 to which the target 220 is opposed, with a resolution of 0.1 nanometer, and the sensor 222 measures a moving displacement of the Y-stage 203.

The target 220 and the Y-axis capacitive sensor 222 are arranged on the Y-axis including the central field-of-view position 212 of the objective lens (i.e., the tip position of the probe 102), within the XY plane. This arrangement allows measurement of a stage displacement of the central field-of-view position 212 of the objective lens (i.e., a displacement of the tip position of the probe 102). The arrangement also allows causes of errors in measured stage displacement data to be minimized, even if Abbe errors occur during the operation of the Y-stage 203. When there is no need to allow for any impacts upon operational accuracy of the Y-stage 203, however, the present invention does not need to be limited to the above-described arrangement of the target 220 and the Y-axis capacitive sensor 222. The target 220 is made up of a metallic material which constitutes the Y-stage 203, and a metallic material capable of providing electrical continuity, and the surface of the target 220 that faces the Y-axis capacitive sensor 222 is precisely ground.

Piezo-elements 209, 210 are bonded between the Y-stage 203 and the X-stage 207, and the X-stage 207 is driven in a direction of an X-axis by equal simultaneous expansion/contraction of the piezo-elements 209, 210. One set of paired driving mechanisms (paired actuator mechanisms), one counterpart constituted by the piezo-element 209 and the elastic deformation sections 208a, 208b, and the other counterpart by the piezo-element 210 and the elastic deformation sections 208c, 208d, are arranged at symmetrical positions with respect to the central field-of-view position 212 of the objective lens (i.e., the tip position of the probe 102). The piezo-elements 209, 210 also provide a maximum moving distance of 20 micrometers and a moving resolution of 1 nanometer.

The X-stage 207 is provided with an X-axis capacitive sensor 223 fixed to at least either one of two holders 201 and 202 by a mechanism not shown, and with a target 221 opposed to the X-axis capacitive sensor 223. A spacing between the target 221 and the X-axis capacitive sensor 223 whose surface is opposed to the target 221 is 200 nanometers. The X-axis capacitive sensor 223 used in this configuration can detect the spacing between the target 221 and the surface of the sensor 223 to which the target 221 is opposed, with a resolution of 0.1 nanometer, and the sensor 223 measures a moving distance of the X-stage 207. The target 221 and the X-axis capacitive sensor 223 are arranged on the X-axis including the central field-of-view position 212 of the objective lens (i.e., the tip position of the probe 102), within the XY plane.

This arrangement allows measurement of a stage displacement of the central field-of-view position 212 of the objective lens (i.e., a displacement of the tip position of the probe 102). The arrangement also allows causes of errors in measured stage displacement data to be minimized, even if Abbe errors occur during the operation of the X-stage 207. When there is no need to allow for any impacts upon operational accuracy of the X-stage 207, however, the present invention does not need to be limited to the above-described arrangement of the target 221 and the X-axis capacitive sensor 223. The target 221 is made up of a metallic material which constitutes the X-stage 207, and a metallic material capable of providing electrical continuity, and the surface of the target 221 that faces the X-axis capacitive sensor 223 is precisely ground.

At the bottom of the X-stage 207, a Z-axis mechanism 213 is installed in a form orthogonal to the plane on which the Y-stage 203 and the X-stage 207 can move. In the Z-axis mechanism 213, fixed sections 218, 219 and a Z-stage 214 are integrally formed in one plane via elastic deformation sections (elements) 215a, 215b, 215c, 215d. Piezo-elements 216, 217 are bonded between the fixed sections 218, 219 and the Z-stage 214, and the Z-stage 214 is driven in a direction of a Z-axis by equal simultaneous expansion/contraction of the piezo-elements 216, 217.

One pair of driving mechanisms, one counterpart constituted by the piezo-element 216 and the elastic deformation sections 215a, 215b, and the other counterpart by the piezo-element 217 and the elastic deformation sections 215c, 215d, are arranged at symmetrical positions with respect to an optical axis 212' of the objective lens, on an XZ plane. The piezo-elements 216, 217 provide a maximum moving distance of 10 micrometers and a moving resolution of 1 nanometer. The probe 102 is installed at the Z-stage 214 via the probe holder 115, and the probe 102 is adapted to align its tip position with the central field-of-view position 212 of the objective lens.

Part of the probe holder 115 is adapted to be opposed to a Z-axis capacitive sensor 224 fixed to at least either one of two holders 201 and 202 by a mechanism not shown. A spacing between the probe holder 115 and the Z-axis capacitive sensor 224 whose surface is opposed to the probe holder 115 is 200 nanometers. The Z-axis capacitive sensor 224 used in this configuration can detect the spacing between the probe holder 115 and the surface of the sensor 224 to which the probe holder 115 is opposed, with a resolution of 0.1 nanometer, and the sensor 224 measures a moving distance of the Z-stage 214. The probe holder 115 and the Z-axis capacitive sensor 224 are arranged on the Z-axis that overlaps the optical axis 212' of the objective lens, within the XZ plane.

This arrangement allows measurement of a stage displacement of the central field-of-view position 212 of the objective lens (i.e., a displacement of the tip position of the probe 102). The arrangement also allows causes of errors in measured stage displacement data to be minimized, even if Abbe errors occur during the operation of the Z-stage 214. The probe holder 115 is made up of a metallic material which constitutes the Z-stage 214, and a metallic material capable of providing electrical continuity, and the surface of the probe holder 115 that faces the Z-axis capacitive sensor 224 is precisely ground.

As described above, in the probe-driving mechanism 101 according to the second embodiment of the present invention, the X-stage 207, Y-stage 203, and Z-stage 214 that three-dimensionally drive (move) the probe 102 can each be operated independently without interfering with one another. Also, for example, for the Y-stage 203, two stage-driving mechanisms, one constituted by two elastic deformation sections 204a, 204b arranged on an extension line of an expansion/contraction axis of the piezo-element 205, on either side thereof, and the other by the piezo-element 206 and the elastic deformation sections 204c, 204d are arranged as a pair across the Y-stage 203. This arrangement equally expands/contracts the piezo-elements 205, 206, thus allowing equal deformation of all elastic deformation sections 204a, 204b, 204c, 204d.

Consequently, it becomes possible to eliminate Abbe's errors of the Y-stage 203 and hence to improve straightness thereof significantly, compared with the straightness obtainable using conventional technology. It is self-evident that these principles of operation are exactly the same as for the X-stage 207 and the Z-stage 214 as well.

The operation of the X-stage 207, Y-stage 203, and Z-stage 214 in the probe-driving mechanism 101 is controlled by a probe-driving mechanism controller 110. In the present embodiment, a stage servo function is added that detects with a stage displacement detector 128 the moving distances of each stage that have been measured by the Y-axis capacitive sensor 222, the X-axis capacitive sensor 223, and the Z-axis capacitive sensor 224, and feeds back measurement results to the probe-driving mechanism controller 110 via a probe scan controller 112. For piezo-elements of the stacked type, the amount of expansion/contraction displacement generated when voltage is applied may vary from element to element. Even in the same piezo-element, hysteresis characteristics also exist between applied voltage and the amount of displacement.

These characteristics of piezo-elements generate positioning errors in the X-stage 207, Y-stage 203, and Z-stage 214 of the probe-driving mechanism 101, and result in deteriorated positioning accuracy of the probe 102. Activating the stage servo function therefore allows positions of the X-stage 207, Y-stage 203, and Z-stage 214 of the probe-driving mechanism 101 to be controlled with accuracy equivalent to either the moving resolution of the piezo-elements employed in each stage of the probe-driving mechanism 101, or a displacement detection resolution level of the capacitive sensors employed in each stage of the probe-driving mechanism 101.

In the present embodiment, since the former (the moving resolution of the piezo-elements) is 1 nanometer and the latter (the displacement detection resolution level of the capacitive sensors) is 0.1 nanometer, scans with the probe 102 can be controlled with a positioning accuracy of 1 nanometer. An aluminum alloy, an iron-nickel alloy with a low thermal expansion coefficient (linear expansion coefficient), or other materials are used to constitute the probe-driving mechanism 101.

Additionally, while the present embodiment has employed piezo-elements to operate the X-stage 207, Y-stage 203, and Z-stage 214 of the probe-driving mechanism 101, the kind of power source (drive source) for each stage is not limited to piezo-elements and can be any linear actuator having the accuracy/capability required for positioning the probe 102.

The observation optical system tube 105 and objective lens 106 arranged at upper portions of the probe-driving mechanism 101 can be moved vertically in the Z-axis direction by means of a moving mechanism not shown, and the objective lens 106 is inserted into the through-hole 211 of the X-stage 207 so as to prevent contact with the probe-driving mechanism 101. In the configuration of the probe-driving mechanism 101 according to the present invention, since a mechanism for scanning with the probe 102 is absent thereon or thereabove, the probe 102 can be directly observed using the objective lens 106, and at the same time, the surface of the wafer 103 can be observed with high resolution. For example, if the objective lens 106 has specifications of 0.3 or more in numerical aperture and 6 millimeters in operating distance, patterns present on the wafer 103 can be clearly observed under the conditions of 1 micrometer or less in resolution.

Additionally, with the probe 102 remaining fixed in position, moving the objective lens 106 and the sample stage 104 downward through the same distance (e.g., 1 millimeter) to such an extent that the objective lens 106 does not come into contact with the probe 102 allows the patterns on the wafer 103 directly below the probe 102 to be observed without being affected by presence of the probe 102 disposed within the field of the objective lens 106. The patterns can be observed in this fashion because the large numerical aperture of the objective lens 106 makes it possible to utilize the optical phenomenon obtained under the conditions where the probe 102 occupies only a part of the field of the objective lens 106.

A configuration and principles-of-operation of a probe deflection detector 109 are exactly the same as those described in the first embodiment of the present invention in accordance with FIG. 3. The probe deflection detector 109, the probe-driving mechanism controller 110, and the stage controller 111 are connected to the probe scan controller 112, all apparatus operation is controlled by a total controller 114, and a three-dimensional image of the surface of the sample to be measured is generated in an SPM image generator.

As described above, according to the second embodiment of the present invention, in the mechanism that scans three-dimensionally with the SPM probe, one set of stage-driving mechanisms, each of the mechanisms being constituted by two elastic deformation sections (elements) arranged on an extension line of the expansion/contraction axis of a piezo-element on either side thereof, are arranged so as to form one pair of stage-driving mechanisms on either side (left or right) of each stage. Equal expansion/contraction of the two piezo-elements provided for each stage, therefore, allows equal deformation of all four deformation sections of the stage.

Consequently, it becomes possible to eliminate Abbe's errors of each stage and hence to improve the straightness thereof significantly, compared with the straightness obtainable using the conventional technology. In addition, the three axes for scanning with the probe can be moved without interfering with one another, and each driving axis can be operated independently. Furthermore, the probe can be precisely positioned by measuring the moving distances of each stage by means of the capacitive sensors installed for each stage, and servo-controlling the stages of the probe-driving mechanism in accordance with measurement results.

Besides, it is possible to obtain a highly accurate SPM image without servo-controlling the stages, by correcting a previously created SPM image in the SPM image generator on the basis of measured moving distance data for the stages by use of the capacitive sensors installed for each stage. Moreover, since a mechanism for scanning with the probe is absent thereon or thereabove, the probe can be directly observed using the objective lens, and at the same time, the surface of the object (sample) to be measured can be observed with high resolution. Thus, measurements can be started immediately after the measuring positions on the sample to be measured have been detected using the observation optics.

According to the second embodiment described above, it is possible to realize highly accurate, rapid in-line SPM with improvements in measuring accuracy and in measuring throughput.

While the second embodiment of the present invention has employed capacitive sensors to detect the moving distances of each stage in the probe-driving mechanism 101, sensors usable to implement the invention are not limited to capacitive sensors and may be optical sensors, ultrasound sensors, or other sensors with displacement resolution equivalent to a moving resolution of piezo-elements, or sensors with arbitrary displacement-measuring resolution.

In addition, installation positions of targets in each stage of the probe-driving mechanism 101 are not limited to the region mentioned in the present embodiment. For example, the target 220 installed on the Y-stage 203 can also be installed on the X-stage 207, whereby a displacement of the Y-stage 203 can be measured by opposing the capacitive sensor 222 thereto.

Figure 8:
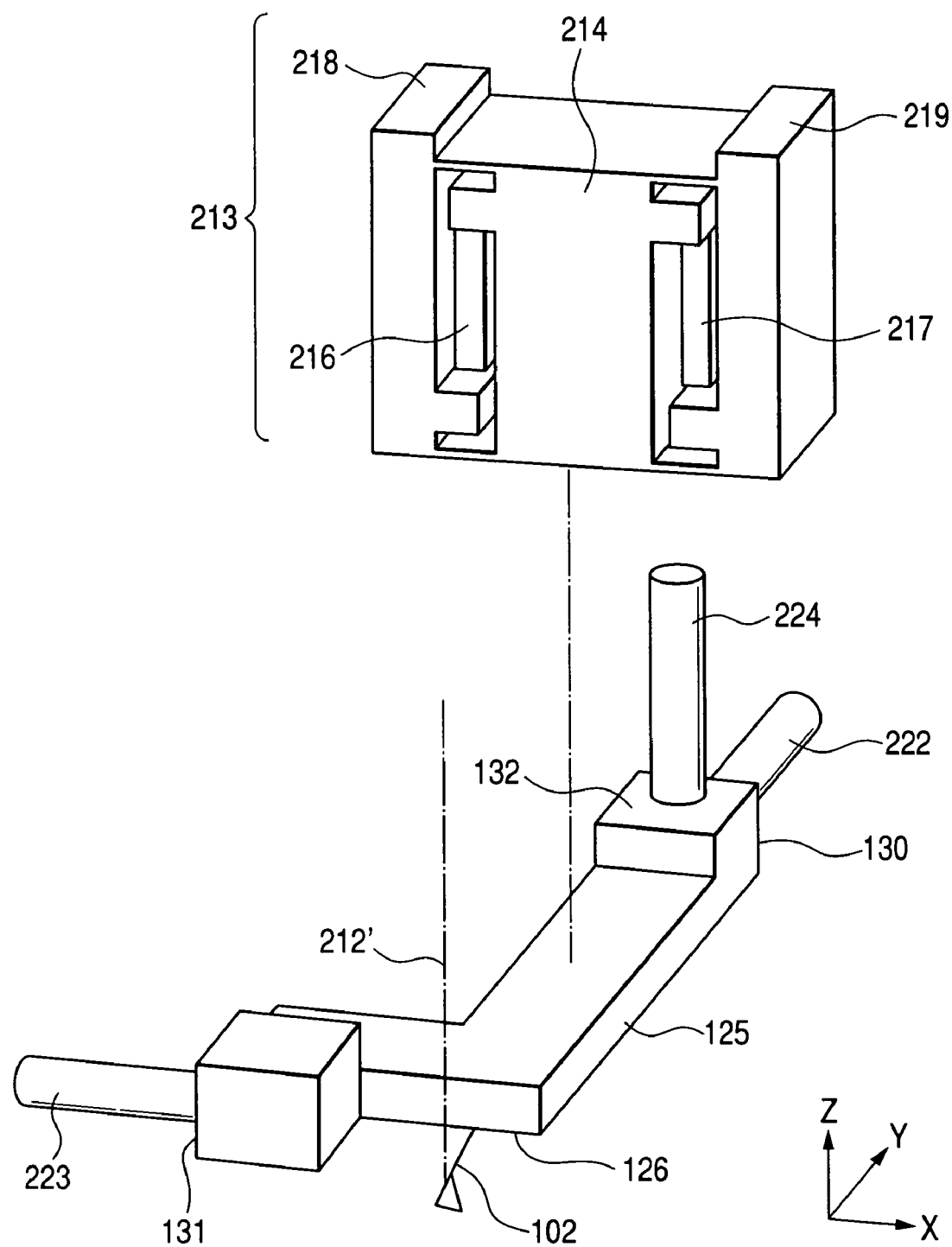
FIG. 8 is a perspective view explaining another schematic structure of the probe holder according to the third embodiment.

Furthermore, while the target 220 of the Y-stage 203 and the target 221 of the X-stage 207 have been provided on upper faces (at the observation optics 105) of the probe-driving mechanism 101 in the present embodiment, the targets may be provided at the bottom (Z-axis mechanism 213) of the probe-driving mechanism 101 instead. Moreover, as shown in FIG. 8, the capacitive sensors can be arranged on a probe holder section. In FIG. 8, a probe holder 125 is formed of the same material as that of the Z-axis mechanism 213, and is installed at the bottom of the Z-stage 214.

A probe 102 is installed at a probe support 126 of a probe holder 125, and a target 130 opposed to the Y-axis capacitive sensor 222, a target 131 opposed to the X-axis capacitive sensor 223, and a target 132 opposed to the Z-axis capacitive sensor 224 are also provided on the probe support 126. A spacing between the capacitive sensors and the targets opposed thereto on the probe holder 125 is 200 nanometers. All the capacitive sensors have a displacement detection resolution of 0.1 nanometer and are fixed to either the holder 201 or 202 of the probe-driving mechanism 101, or both of the holders, by a mechanism not shown. A tip position of the probe 102 aligns with the optical axis 212' of the objective lens 106.

The Y-axis capacitive sensor 222 is disposed on the Y-axis including the central field-of-view position 212 of the objective lens 106 (i.e., the tip position of the probe 102), within the XY plane, and measures a Y-axial moving distance through which the Y-stage 203 has moved in the XY plane. The X-axis capacitive sensor 223 is disposed on the X-axis including the central field-of-view position 212 of the objective lens 106 (i.e., the tip position of the probe 102), within the XY plane, and measures an X-axial moving distance through which the X-stage 207 has moved in the XY plane. The Z-axis capacitive sensor 224 is disposed at the position where it overlaps the optical axis 212' of the objective lens, within the XZ plane, and measures a Z-axial moving distance through which the Z-stage 214 has moved.

Similarly to the foregoing second embodiment, the arrangement shown in FIG. 8 makes it possible, by measuring the displacements of the Y-stage 203, X-stage 204, and Z-stage 214 in the probe-driving mechanism 101, to minimize causes of errors in measured stage displacement data and measure an accurate moving distance of the probe 102, even if pitching, yawing and/or rolling occurs during the operation of each stage.

Third Embodiment

Figure 6:
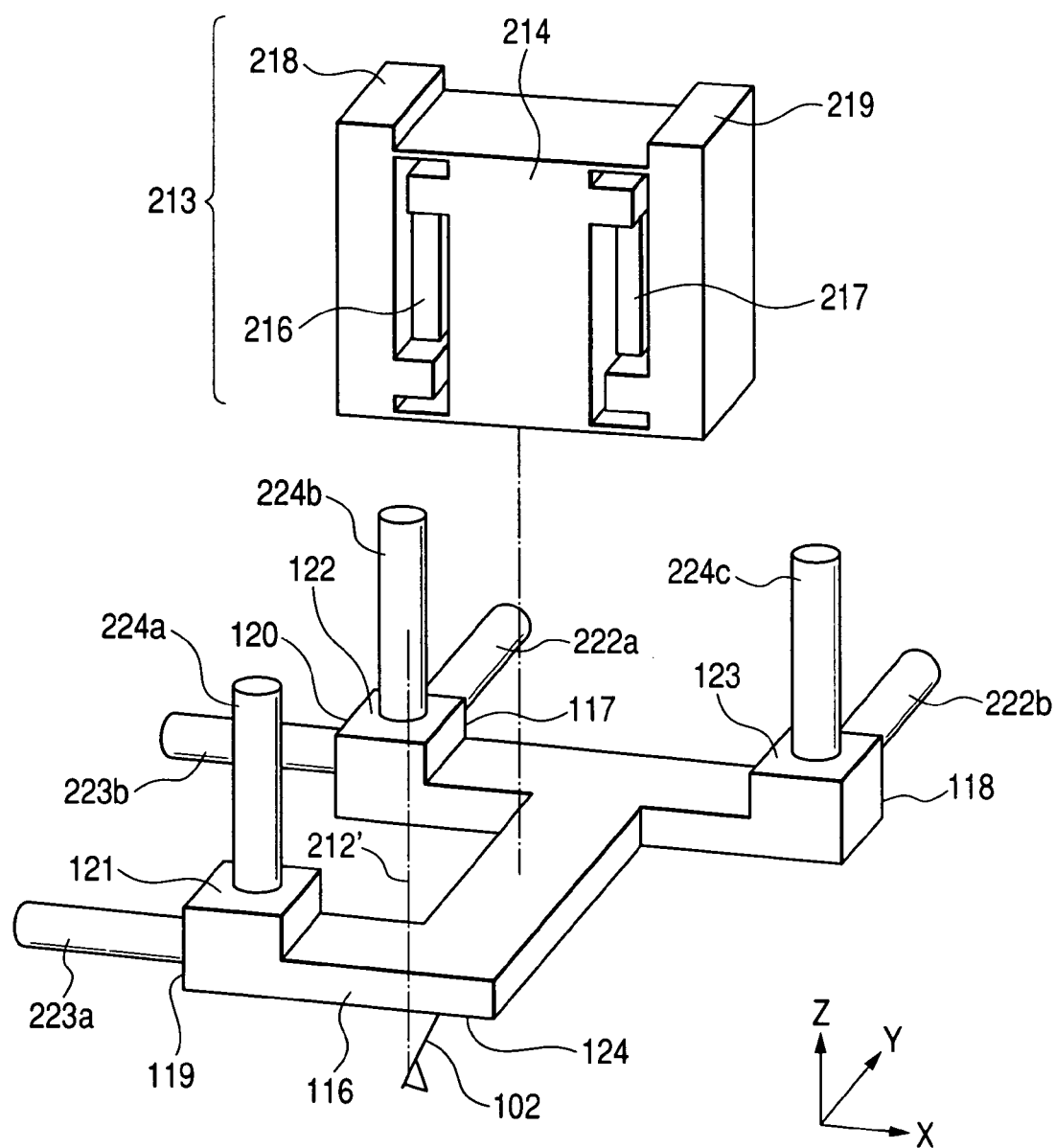
FIG. 6 is a perspective view for explaining a schematic structure of a probe holder according to a third embodiment of the present invention.

A structure of a probe holder according to a third embodiment of the present invention, and successive operational sequences of an SPM according to the present invention will be described below. FIG. 6 is a variation of the probe holder 115 used in the second embodiment of the present invention. A probe holder 116 is formed of the same material as that of a Z-axis mechanism 213, and is installed at the bottom of a Z-stage 214. A probe 102 is installed at a probe support 124 of the probe holder 116. Targets 117, 118 opposed to Y-axis capacitive sensors 222a, 222b, respectively, targets 119, 120 opposed to X-axis capacitive sensors 223a, 223b, respectively, and targets 121, 122, 123 opposed to Z-axis capacitive sensors 224a, 224b, 224c, respectively, are also provided on the probe support 124. A spacing between the capacitive sensors and the targets opposed thereto on the probe holder 116 is 200 nanometers.

All the capacitive sensors have a displacement detection resolution of 0.1 nanometer and are fixed to either a holder 201 or 202 of a probe-driving mechanism 101, or both of the holders, by a mechanism not shown. A tip position of the probe 102 aligns with an optical axis 212' of an objective lens 106.

The Y-axis capacitive sensors 222a, 222b are disposed in parallel in a direction orthogonal to a moving direction of a Y-stage 203, and by measuring any displacements of the two targets 117, 118 of the probe holder 116, the sensors 222a, 222b detect a Y-axial moving displacement through which the Y-stage 203 has moved in an XY plane. At this time, if a difference in moving distance occurs between the Y-axis capacitive sensors 222a, 222b, an error in straightness of the Y-stage 203 can be corrected for by independently servo-controlling the piezo-elements 205, 206 that drive the Y-stage 203.

Simultaneously with this correction, a pitching error in the Y-stage 203 can be detected by measuring any displacements of the Z-axis capacitive sensors 224a, 224b. Also, a rolling error in the Y-stage 203 can be detected by measuring any displacements of the Z-axis capacitive sensors 224b, 224c.

The X-axis capacitive sensors 223a, 223b are disposed in parallel in a direction orthogonal to a moving direction of an X-stage 207, and by measuring any displacements of the two targets 119, 120 of the probe holder 116, the sensors 223a, 223b detect an X-axial moving displacement through which the X-stage 207 has moved in the XY plane. At this time, if a difference in moving distance occurs between the X-axis capacitive sensors 223a, 223b, an error in straightness of the X-stage 207 can be corrected for by independently servo-controlling the piezo-elements 209, 210 that drive the X-stage 207.

Simultaneously with this correction, a pitching error in the X-stage 207 can be detected by measuring any displacements of the Z-axis capacitive sensors 224b, 224c. Also, a yawing error in the X-stage 207 can be detected by measuring any displacements of the Z-axis capacitive sensors 224a, 224b.

The Z-axis capacitive sensors 224a, 224b, 224c are disposed in parallel in the XY plane, and by measuring any displacements of the three targets, 121, 122, 123, of the probe holder 116, the sensors 224a, 224b, 224c detect a Z-axial moving distance through which the Z-stage 214 has moved. At this time, if a difference in moving displacement occurs between the Z-axis capacitive sensors 224b, 224c, an error in straightness of the Z-stage 214 can be corrected for by independently servo-controlling the piezo-elements 216, 217 that drive (actuate) the Z-stage 214.

Simultaneously with this correction, a pitching error in the X-stage 207 can be detected by measuring any displacements of the Z-axis capacitive sensors 224b, 224c. Also, a rolling error in the X-stage 207 can be detected by measuring any displacements of the Z-axis capacitive sensors 224a, 224b.

In particular, if pitching and/or yawing occurs during operation of the Y-stage 203 and/or the X-stage 207, these events deteriorate the flatness existing during XY planar scanning with the probe 102 and result in the deterioration appearing prominently as a vertical measuring error in a three-dimensional SPM image obtained from surface profile data measurement of a wafer 103. According to the present embodiment, a positioning error of the probe 102 on the XY plane can be detected very accurately and a three-dimensional profile image generated by an SPM image generator 113 can be corrected by using detection results to obtain a highly accurate SPM image.

Figure 7B:
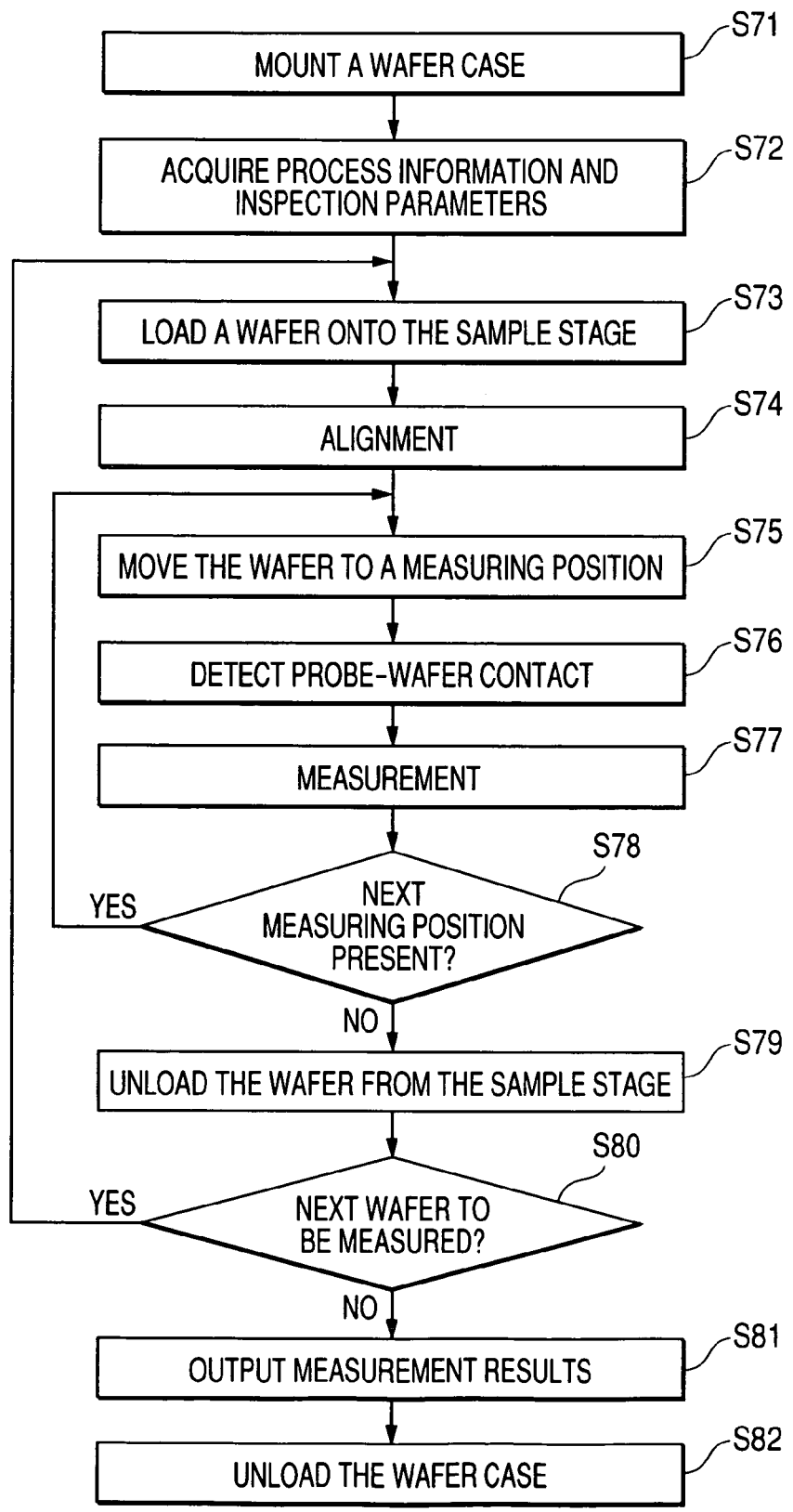

Next, operation of an SPM according to the present invention will be described below using FIGS. 4, 7A and 7B. FIG. 7A is a diagram showing part of the semiconductor-manufacturing processes that use an SPM of the present invention, the figure also explaining in-line SPM functions. Wafers that have been processed by a manufacturing apparatus A first and then a manufacturing apparatus B are divided into those which are to be further processed in one-lot units by a manufacturing apparatus C, and those which are to be measured by the SPM 401 before being processed by the manufacturing apparatus C. A rate between both is specified to a host computer 400 by an operator beforehand with consideration being given to a throughput (wafer-processing capability per unit hour) of the SPM 401. All the manufacturing apparatuses A~C and the SPM 401 are connected to the host computer 400 of a semiconductor-manufacturing line via a data network 402, and all wafers being manufactured have respective historical records, manufacturing processes, and other factors managed by the host computer 400. The wafers are transported between the various manufacturing apparatuses by a transport apparatus not shown. For example, the manufacturing apparatus A is a dry etcher, the manufacturing apparatus B a resist separator, and the manufacturing apparatus C a film deposition apparatus.

Wafers whose processing by the manufacturing apparatus B has been completed are transported to the SPM 401 at a predetermined rate in accordance with process management information of the wafers managed by the host computer 400. The SPM 401 inquires of the host computer 400 the process management information of the transported wafers, and conducts measurements after obtaining coordinate information of measuring positions on each wafer. After the measurements, the SPM 401 outputs measurement results associated with each measuring position on the wafer, to the host computer 400, then the wafer is transported to the manufacturing apparatus C by the transport apparatus.

The host computer 400 analyzes the measurement results obtained from the SPM 401, and as required, modifies (optimizes) processing parameters of each manufacturing apparatus. For instance, a level difference of a surface to be etched is measured at a plurality of positions on the wafer by the SPM 401, and depending on particular level (dispersion) of non-uniformity in level difference between these positions, appropriate modifications and/or others are conducted on etching parameters of the manufacturing apparatus A (the dry etcher). Otherwise, analyzing the SPM measurement results may be followed by returning the wafer to the manufacturing apparatus B for reprocessing. The processing parameters in these cases are executed independently of normal processing parameters of each manufacturing apparatus, and these independent processing parameters are properly determined and managed by the host computer 400 according to particular SPM measurement results. The operator may intervene in feedback of the above data (under special circumstances, this form of feedback may be replaced by the feedforward that uses the SPM measurement results to determine the processing parameters to be applied in the manufacturing processes that follow the SPM measurements).

In the above process flow, when the processing parameters of each manufacturing apparatus are determined (optimized) on the basis of the SPM measurement results, these processing parameters can be set more closely as the SPM measurement results are of higher accuracy. Additionally, to use the SPM 401 as an in-line apparatus in the semiconductor-manufacturing processes, it is ideal that SPM measurement of the wafers that have been processed by the manufacturing apparatus located upstream with respect to the SPM 401 should be completed before these wafers are processed by the next manufacturing apparatus without being passed through the SPM 401. Improvement of in-line SPM throughput, therefore, is absolutely necessary.

FIG. 7B is a flow chart explaining a series of SPM operational sequences. The following is a detailed operational description of the SPM 401, given in conjunction with FIG. 4. Wafers whose processing by the manufacturing apparatus located at process sites upstream with respect to the SPM 401 are stored into cases on a lot-by-lot basis, and then these cases are mounted in an SPM wafer cassette by the transport apparatus in the semiconductor-manufacturing line (S71). The SPM 401 reads a bar code from one of the wafer cases and acquires appropriate process information and inspection parameters from the host computer 400 in the semiconductor-manufacturing line (S72). After this, a loader of the SPM picks one wafer from the wafer cassette and mounts the cassette on a sample stage 104 so that an orientation flat of the wafer faces in a fixed direction (S73).

A wafer 103 is vacuum-attracted by the sample stage 104, and after a wafer number inscribed on the surface of the wafer 103 has been read by a detector not shown, the wafer on the sample stage 104 is moved to a position directly under the probe-driving mechanism 101. At this time, the sample stage 104 is positioned Z-axially at a bottom dead center.

Before the above operation is completed, observation optics 105 moves upward to a top dead center and pivots a revolver not shown. Thus, the objective lens 106 is replaced with an alignment objective lens (not shown) that has a low magnification of about 50 times, for example. The objective lens 106 and the alignment objective lens are of the same focal length. The replacement is followed by downward movement of the observation optical system 105, a focus position of which is then adjusted for matching to a rear face (upper face) of the probe 102. This focusing operation is conducted automatically by image recognition of an optical image processor 108.

After this, the observation optical system 105 is further moved downward through a fixed distance (e.g., 1 millimeter) to shift a focus of the observation optical system 105 to a position lower than a position at which an SPM image is to be sampled.

After moving in an XY direction to such a position as to bring an alignment mark position on the wafer 103 into a field of view of the alignment objective lens (not shown), the sample stage 104 gradually rises in a Z-direction and matches the surface of the wafer 103 to the focus of the observation optical system 105. The optical image processor 108 then conducts the image recognition of the alignment mark.

At this time, under the conditions where a numerical aperture of the alignment objective lens is small, the probe 102 may be simultaneously observed on an optical image obtained by the observation optical system 105. Image recognition of the alignment mark, therefore, is desirably conducted at the position where the alignment mark and the probe 102 do not overlap each other. Image recognition of the alignment mark on the wafer 103 is conducted in at least two places or more, so a correlation between the patterns existing on the wafer 103, and XY coordinates of the sample stage 104, is obtained and the correlation is stored into a total controller 114.

During alignment of the wafer 103, since the observation optics 105 is moved downward through a fixed distance to shift the focus of the observation optics 105 to a position lower than the position at which an SPM image is to be sampled, the surface of the wafer 103 and the probe 102 do not come into contact with each other. After the alignment, the observation optical system 105 once again moves upward to the top dead center and pivots the revolver not shown. Thus, the objective lens is replaced with an objective lens 106 that has a high magnification of about 100 times, for example. The replacement is followed by downward movement of the observation optical system 105, the focus position of which is then adjusted for matching to the rear face (upper face) of the probe 102.

This focusing operation is conducted automatically by image recognition of the optical image processor 108. Furthermore, the observation optical system 105 is moved downward through a fixed distance (e.g., 1 millimeter) to shift the focus of the observation optical system 105 to a position lower than the position at which an SPM image is to be sampled. While the operation of replacing the objective lens during the alignment of the wafer 103 has been described above, the observation optical system 105 may have a zoom function for optical images and be constructed so as to allow an observing magnification to be changed without replacing the objective lens. The above is an alignment step (S74).

On the basis of the inspection information (coordinate information) obtained from the host computer 400, the total controller 114 moves the sample stage 104 to a position in the XY direction where the first measuring position falls within a field of view of the observation optical system 105. The optical image processor 108 conducts image recognitions of the measuring positions (or patterns around the measuring positions) included in the field of view of the observation optics 105 (i.e., in a display region of a TV monitor 107), and precisely trues the measuring positions by conducting fine adjustments on an XY axis of the sample stage 104.

The objective lens 106 has a magnification of 100 times, and moving the observation optical system 105 downward through a fixed distance (e.g., 1 millimeter) to shift the focus of the observation optical system 105 to a position lower than the position at which an SPM image is to be sampled allows the surface of the wafer 103 to be observed at high resolution without being affected by the presence of the probe 102 disposed within the field of view of the objective lens 106. For example, if the objective lens 106 has specifications of 0.3 or more in numerical aperture, the patterns on the wafer 103 can be observed clearly under the conditions of 1 micrometer or less in resolution. The patterns on the wafer 103 directly below the probe 102 can also be observed. This is because the large numerical aperture of the objective lens 106 makes it possible to utilize the optical phenomenon obtained under the conditions where the probe 102 occupies only a part of the field of the objective lens 106.

The measuring positions may likewise be specified by the operator, in which case the operator observes the TV monitor 107 and directly specifies coordinates from the total controller 114. After this, the observation optical system 105 is moved upward through a fixed distance and the focus position of the optical system 105 is adjusted for matching to the rear face (upper face) of the probe 102.

The SPM according to the present invention does not require moving the sample stage 104 during a time from determination of the measuring positions in the field of view of the observation optical system 105 to completion of subsequent measurements. In conventional SPMs, since a probe-driving mechanism is present directly above a probe, the field position of observation optical system and an SPM image measuring position differs from each other, for which reason, a stage operation time for moving a measuring point to the SPM image measuring position has been required for precise repositioning. Otherwise, even if the conventional SPM has a function that observes the measuring point and the probe without moving a sample stage 104, the presence of the probe-driving mechanism directly above the probe has made it impossible to raise the numerical aperture of the observation optical system and thus to observe the patterns on the wafer surface. In the SPM of the present invention, however, the probe-driving mechanism 101 has a through-hole 211, which allows measuring positions and the probe 102 to be observed directly above the probe by using an objective lens of a high numerical aperture, without operating the sample stage 104. The above is a step of moving the wafer to a measuring position (S75).

Next, the operation of bringing a tip of the probe 102 into contact with the surface of the wafer 103 will be described. The probe-driving mechanism 101 is a three-dimensional (X, Y, Z) probe-scanning mechanism constructed so that the stages each having elastic deformation sections (elements) are driven (moved) by piezo-elements, and the probe 102 held by a probe holder 115 is installed at a bottom portion of the mechanism. The probe-driving mechanism 101 has a through-hole for inserting the objective lens 106 in a non-contact fashion, and adjusting a focus axis (not shown) of the observation optical system 105 makes it possible to observe the probe 102 and the surface of the wafer 103 without moving the sample stage 104. The probe-driving mechanism 101 has a moving region of 20 micrometers in the X-axis direction, 20 micrometers in the Y-axis direction, and 10 micrometers in the Z-axis direction. A detailed structure of the mechanism is as shown in FIGS. 5A-5C.

Contact between the tip of the probe 102 and the surface of the wafer 103 is achieved by repeating three steps while monitoring a detection signal generated by a probe deflection detector 109. A first step (1) is to raise a height of the Z-axis of the probe-driving mechanism 101 to a top dead center, a second step (2) is to move the Z-axis of the sample stage 104 through 10 micrometers, and a third step (3) is to lower the height of the Z-axis of the probe-driving mechanism 101 to a bottom dead center. That is to say, if the tip of the probe 102 comes into contact with the surface of the wafer 103 in above step (3), the contact changes the detection signal of the probe deflection detector 109. A probe scan controller 112 detects the contact between both by recognizing the change. Detailed principles of operation are as described per FIG. 3. The above is a step of detecting the probe-wafer contact (S76).

After the detection of the contact between the tip of the probe 102 and the surface of the wafer 103, the probe-driving mechanism 101 is driven to scan the probe 102 and thus to sample an SPM image. For example, a one-micrometer square region on the wafer 103 is split into 256 segments in an X-direction and 10 segments in a Y-direction, and after the probe 102 has been moved upward through, for example, 1 micrometer, that contact position is sequentially shifted in the X-direction (Y-direction), whereby the contact between the probe 102 and the surface of the wafer 103 is repeatedly detected. The detection of the contact, however, is conducted by operating only the probe 102 in a moving range of the probe-driving mechanism 101, without moving the sample stage 104.

Operation of the probe-driving mechanism 101 is controlled via a probe-driving mechanism controller 110 by the probe scan controller 112. As shown in FIGS. 5A-5C, capacitive sensors are installed at each moving axis (X-, Y-, Z-stage) of the probe-driving mechanism 101, and displacements of each capacitive sensor are detected by a stage displacement detector 128. Detection results are saved in the SPM image generator 114 via the probe scan controller 112.

The SPM image generator 114 generates an XY plane distribution image of the displacement of the probe 102 that was measured when in contact with various contact points on the wafer 103 (i.e., Z-stage displacement of the probe-driving mechanism 101). The piezo-elements used in the probe-driving mechanism 101 are operable at a response rate from 2 to 3 kilohertz. The above measurements are completed within several seconds, and the thus-obtained SPM image (data) is saved (stored) in the total controller 114. The above is a measurement step (S77).

The measuring coordinates existing on the wafer 103, and the number of measuring positions thereon are predetermined, and if there are other measuring positions left on the wafer 103 in a step (S78), the observation optical system 105 and the sample stage 104 are moved downward through the same distance. After this, the XY coordinates on the stage 104 are moved to coordinates of the next measuring position and measurements are started once again. If other measuring positions are not present on the wafer 103, the observation optical system 105 and the sample stage 104 are moved downward through the same distance and the wafer 103 is unloaded from the sample stage 104 (S79). If the next wafer to be measured is present in a wafer case in a step (S80), this wafer is loaded onto the sample stage 104 and measurements are repeated. When measurements of all wafers within the wafer case are completed, data that was saved in the total controller 114 is output to the host computer 400 (S81) and a transport apparatus not shown transports the wafer case to the next processing apparatus (S82).

In the conventional SPMs, there has been a need, with each change of the measuring position on the same wafer, to recognize the measuring position using the observation optical system that conducts measurement positioning, and move the sample stage to the probe-scanning mechanism (the position of the probe 102). For a spacing of 150 millimeters between the position of the observation optical system that conducts measurement positioning, and the probe-scanning mechanism (the position of the probe 102), a time from 2 to 3 seconds is required for the operation of the sample stage. When 10 measuring positions are present on one wafer, therefore, the total sample-stage operation time required for measurement positioning ranges from 20 to 30 seconds, and this has reduced the measuring throughput of the SPM significantly.

The operation of the SPM according to the present invention makes it possible to omit the time required for measurement positioning, since adjusting the focus of the observation optical system 105 allows the probe 102 and the surface of the wafer 103 to be observed without moving the sample stage 104. Consequently, the time required for a series of apparatus operational sequences for one wafer that is to be measured (that is, loading the wafer and after measuring, for example, at nine positions, any level differences of a surface to be etched, unloading the wafer) can be reduced to 2 minutes (30 wph) and an in-line SPM with improved throughput can be realized.

While a scanning probe microscope used in the field of the surface profile determination intended for semiconductor wafers has been taken as an example in the description of the present invention, a precise positioning mechanism according to the invention can be applied as a precise positioning apparatus for the products and manufacturing apparatus used in technical fields such as bioelectronics and micromachining.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications as fall within the ambit of the appended claims.

We claim:

1. A scanning probe microscope that measures a surface profile of a sample by bringing a probe into close proximity to or contact with the surface of the sample and scanning the sample surface, the scanning probe microscope comprising:
   a sample stage movable in at least one axis direction with the sample mounted on the sample stage;
   a probe which is brought into close proximity to or contact with the surface of the sample mounted on the sample stage, wherein the probe scans the sample surface;
   a probe-driving unit for moving the probe three-dimensionally;
   a displacement measuring unit for measuring displacements of three axis directions of the probe moved three-dimensionally by the probe-driving unit;
   a deflection detector for detecting a deflection of the probe; and
   an observation optical system which has an objective lens and observes the probe disposed on essentially an optical axis of the objective lens, and the sample;
   wherein the probe-driving unit includes three sets of paired drive sources arranged symmetrically with respect to the optical axis of the objective lens, and
   wherein the displacement measuring unit includes each of at least three sets of displacement detectors arranged in each of the three axis directions so as to control each of the sets of paired drive sources by using each output of the at least three sets of the displacement detectors.

2. The scanning probe microscope according to claim 1, wherein the three sets of paired drive sources arranged symmetrically with respect to the optical axis of the objective lens in the probe-driving unit are installed in three axis directions orthogonal to one another, so as to form one pair in each of the axis direction.

3. The scanning probe microscope according to claim 1, wherein each of the three sets of paired drive sources are connected with both sides of elastic deformation elements.

4. The scanning probe microscope according to claim 1, wherein each of the paired drive sources is constructed of a piezoelectric element.

5. The scanning probe microscope according to claim 1, wherein the probe driving unit scans the probe on the surface of the sample while the probe is operationally alternated between contact with and spacing from the sample surface by moving the probe vertically with respect to the sample surface.

6. The scanning probe microscope according to claim 1, wherein the objective lens is disposed directly above the probe, with a numerical aperture of at least 0.3 or more, and wherein the observation optical system has a resolution equal to or less than 1 μm on the sample.

7. The scanning probe microscope according to claim 1, wherein each of the displacement detectors is formed with a capacitive sensor.

8. The scanning probe microscope according to claim 1, wherein each of the paired drive sources is formed with a piezo-electric element.

9. A scanning probe microscope that measures a surface profile of a sample by bringing a probe into close proximity to or contact with the surface of the sample and scanning the sample surface, the scanning probe microscope comprising: a sample stage movable in at least one axis direction with the sample mounted on the sample stage; a probe which is brought into close proximity to or contact with the surface of the sample mounted on the sample state, wherein the probe scans the sample surface; a probe-driving unit for moving the probe three-dimensionally; a displacement measuring unit for measuring displacements of three axis directions of the probe moved three-dimensionally by the probe-driving unit; a deflection detector for detecting a defection of the probe; and an observation optical system which has an objective lens and observes the probe disposed on essentially an optical axis of the objective lens, and the sample; wherein the probe-driving unit includes three sets of paired drive sources arranged symmetrically with respect to the optical axis of the objective lens, and wherein the displacement measuring unit includes each of at least three sets of displacement detectors arranged in each of the three axis directions so as to control each of the sets of paired drive sources by using each output of that at least three sets of the displacement detectors, each of the at least the three sets of the displacement detectors being juxtaposed with a plurality of displacement detectors.

10. The scanning probe microscope according to claim 9, wherein each of the plural juxtaposed displacement detectors is formed with a capacitive sensor.

* * * * *